No. 800,324. PATENTED SEPT. 26, 1905.
N. SALTONSTALL.
SYSTEM FOR HEATING.
APPLICATION FILED AUG. 17, 1904.

2 SHEETS—SHEET 1.

Witnesses
Thos. E. Edwards.
J. C. Binns.

Inventor
Nathaniel Saltonstall
By Victor E. Randall
Atty.

No. 800,324. PATENTED SEPT. 26, 1905.
N. SALTONSTALL.
SYSTEM FOR HEATING.
APPLICATION FILED AUG. 17, 1904.
2 SHEETS—SHEET 2.
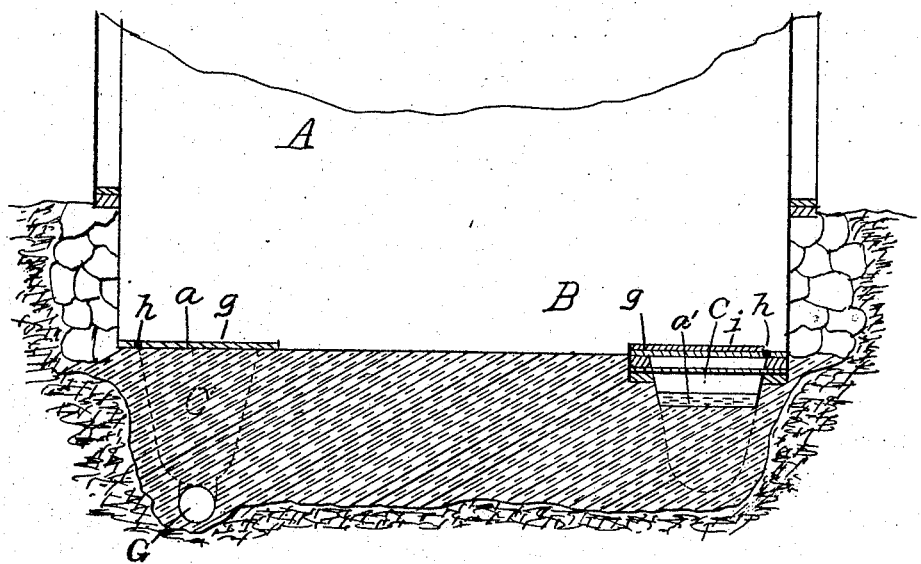
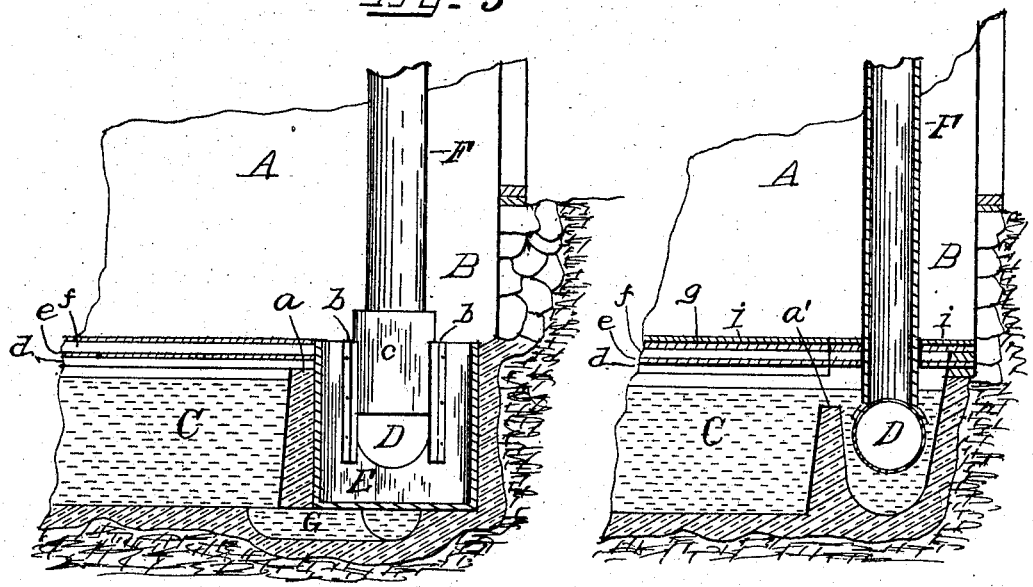

UNITED STATES PATENT OFFICE.

NATHANIEL SALTONSTALL, OF BATTLECREEK, MICHIGAN.

SYSTEM FOR HEATING.

No. 800,324.      Specification of Letters Patent.      Patented Sept. 26, 1905.

Application filed August 17, 1904. Serial No. 221,028.

*To all whom it may concern:*

Be it known that I, NATHANIEL SALTONSTALL, a citizen of the United States, residing at Battlecreek, in the county of Calhoun and State of Michigan, have invented certain new and useful Improvements in Systems for Heating; and I do hereby declare the following to be a full, clear, and exact description of the invention, such as will enable others skilled in the art to which it appertains to make and use the same, reference being had to the accompanying drawings and to the letters placed thereon as marks of reference.

This invention relates to a system for heating, and the object of the invention is to provide a simple and inexpensive method for heating greenhouses, incubators, brooders, and other apartments where heat at low temperature is desired.

Briefly comprehended, it comprises a shallow cemented water-channel having a sheet-metal diaphragm covering the same, above the latter of which a series of trap-doors are arranged to regulate the heat encircling the floor of a covered inclosure, and a submerged heating apparatus placed within said channel at a portion thereof to supply heat to the water contained therein.

The invention consists in the arrangement and construction of the different parts, as will be hereinafter more fully set forth, and specifically pointed out in the claims following this specification.

Figure 1:
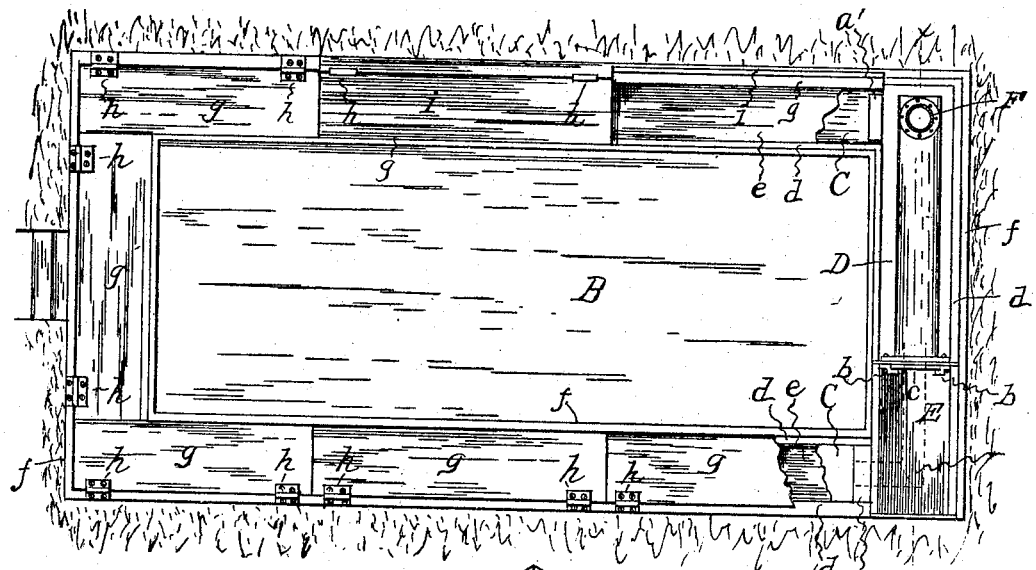
Figure 2:
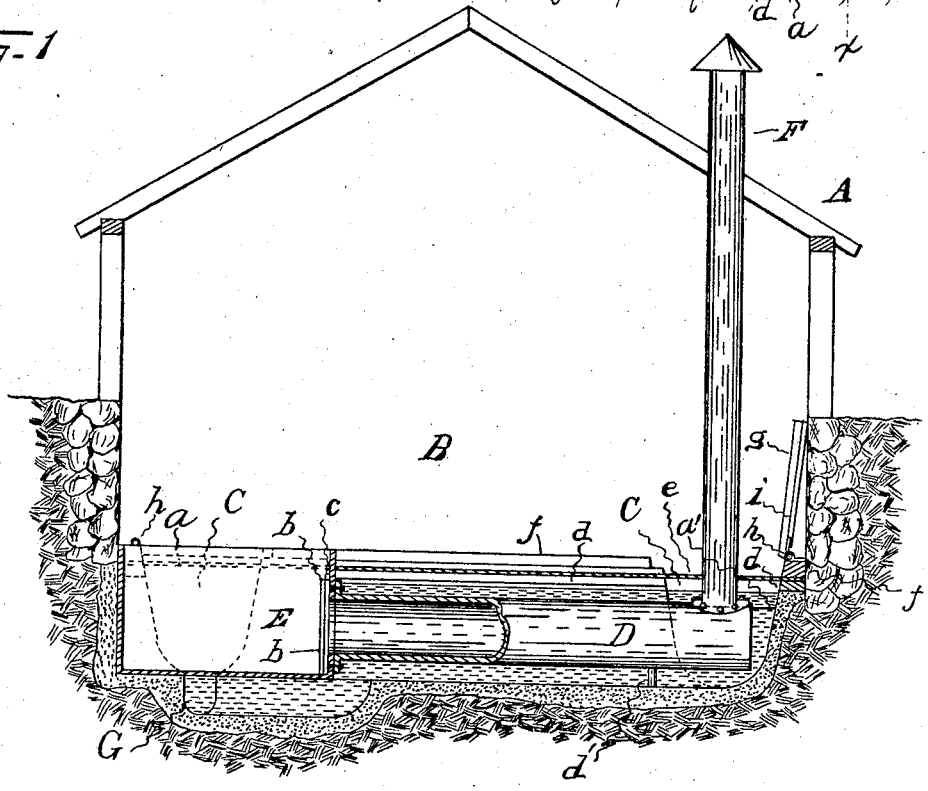

Figure 1 represents a ground plan view of my improved system for heating, the covering to the heating apparatus being removed and portions of the covering to the water-channel removed to show the dams I employ to restrict the flow of water therein. Fig. 2 is an end view in elevation on the line $x\ x$ of Fig. 1 and shows the heating apparatus I employ for affording heat to the water within the channel. Fig. 3 represents a cross-section at a point bisecting the dams $a$ and $a'$. Fig. 4 is a longitudinal sectional view bisecting the dam $a$, and Fig. 5 is a longitudinal sectional view bisecting the dam $a'$.

In the drawings like marks of reference refer to corresponding parts throughout the different views.

A is a housing encompassing my improved system for heating; B, an excavation or shallow cellar within the same; C, an excavation forming an encircling channel whose sides are made water-tight by plastering with water-lime, Portland cement, or other equivalent, and D is a heating apparatus located within said channel and connected at one end with a pit or trap E for supplying the same with fuel and at the opposite end with a smoke-pipe F.

So far I have explained my heating system as occupying a position within the outer edge of a shallow cellar. This principle is employed where the same is used for brooders to great advantage, from the fact that brooding-pens may be located thereabove, so that their floors may be on a level with the surrounding ground. It may also be used to advantage for incubating purposes. However, I do not wish to be understood as limiting myself to this particular construction, as it is used to great advantage for greenhouse purposes where the flooring is equal to or slightly above or just below the surrounding ground.

Intersecting the channel C at two points thereof dams $a$ and $a'$ are located, the former being located back of and adjoining the pit E to the heating apparatus D and of a height extending above the water-line in the channel, the latter being located forward of the heating apparatus and terminating below the water-level in said channel, as shown. As shown in the drawings, the preferred form of locating this heating apparatus is at one end of the elongated rectangular channel C between the dams $a$ and $a'$. The heating apparatus may be portable; and it consists of a cylindrical fire-box and heating-chamber D, the forward end of which opens within a sheet-metal pit E, having a closed bottom, and is provided at its opposite end with a smoke-pipe F. To either side of the fire-box Z-shaped vertical strips $b$ are provided, and between these strips a vertically-adjustable door $c$ is placed, while at the forward end of the fire-box a leg or other support $d'$ is provided.

Connectively uniting the channel C where the pit E intersects the same a conduit G is provided and passes from the bottom of said channel below the dam $a$ and beneath said pit and connects with the water-space beneath the aforesaid heating apparatus.

As the water surrounding the heating apparatus gets warm the hotter water rises and flows over the dam $a'$ and causes a current to pass along the channel C, while the water opposite the pit E will be drawn below the dam $a$ and passing through the conduit G will in turn become heated and keep a circulation of water passing along the channel within which it is contained. A further object of the dam $a'$ is to prevent the under cooler water from flowing back to the heating apparatus and retard the circulation. Within or upon the upper edges of the water-channel C wooden timbers $d$ are placed, and hermetically attached upon the same a thin metallic diaphragm forming a covering $e$ is placed.

Resting upon the edges of the hermetically-sealed water-covering $e$ a secondary set of wooden ledges $f$ are placed. These ledges form seats to which thin wooden or other doors $g$ are secured by hinges $h$.

As the water immediately above and in close proximity to the heating apparatus will be somewhat superheated and that the same will not unduly influence the immediate surroundings, I cover the lids or doors $g$ nearest said apparatus with sheets of non-conducting material $i$—such as asbestos, paper, &c.—diminishing said covering as the occasion may require. Between the covering $e$ and the doors $g$ when closed a dead-air space is formed, a means whereby the heat generated from the water beneath can be regulated to a minimum, the doors answering the purpose of liberating latent heat when opened to augment the general temperature of the room to be heated. These doors may be lifted by cords and pulleys, handles, or other means that would be readily suggested by an adept.

But little expense is incurred in equipping a greenhouse, brooding-pen, or other inclosure with my heating system, as the same can be installed by any artisan of ordinary ability without previous experience. It requires but little fuel, needs no engineer, and a large volume of heat at low temperature can be always maintained.

Having described my invention, what I claim as new, and desire to secure by Letters Patent, is—

1. The combination with a housing, of an annular water-receptacle formed beneath the flooring of said housing, a pit interposed within said water-receptacle and extending above the same, a heating apparatus submerged within said water-receptacle and opening within said pit, a smoke-pipe leading from the opposite end of said heating apparatus, a dam intersecting said water-receptacle adjacent to said pit, a duct leading from below said dam and pit and communicating with said water-receptacle below the water-level thereof adjacent to and forward of said heating apparatus, and a hermetically-sealed covering to said water-receptacle, substantially as, and for the purpose set forth.

2. The combination with a housing of an annular water-receptacle formed below the flooring of said housing, said receptacle comprising an excavation having water-tight walls provided with dams, one of which extends above, the other below the water-level in said excavation, a duct opening below the bottom of the dam extending above the water-level, and a portable heating apparatus submerged within said water-receptacle in immediate proximity to said dams, a hermetically-sealed covering to said water-receptacle slightly below the top thereof, and trap-doors adapted to close the top of said water-receptacle to form a dead-air space between said sealed covering and said doors, substantially as, and for the purpose set forth.

3. The combination with a housing having its bottom below the level of the surrounding ground, of a water-receptacle comprising an excavation or channel adapted to retain water, a dam intersecting said channel and extending above the water-level thereof, a duct leading below said dam, a heating apparatus interposed within said water-receptacle, said apparatus comprising a pit, a fire-box opening within said pit and a smoke-flue leading from said fire-box, said pit extending above the water within said receptacle, said duct leading below said pit and communicating with water below said heating apparatus, a dam intersecting said water-channel adjacent to the forward end of said heating apparatus, timbers seated upon the walls of said channel, a hermetically-sealed covering secured to said timbers, and doors hinged to timbers above said covering, all arranged to work substantially as, and for the purpose set forth.

4. The combination with a housing, of an annular water-receptacle formed below the flooring thereof, said receptacle comprising an excavation having water-tight walls provided with dams, one of which extends above, the other terminating below the water-level in said receptacle, a duct leading below the dam extending above the water-level, and a heating apparatus submerged within said water-receptacle in immediate proximity to said dams, the one being at one end thereof, the other being at the other end thereof, for the purpose set forth.

NATHANIEL SALTONSTALL.

Witnesses:
H. F. WINGATE,
F. H. WINGATE.